(12) United States Patent
Fukuzawa et al.

(10) Patent No.: US 6,465,534 B2
(45) Date of Patent: Oct. 15, 2002

(54) ELASTIC SPONGE

(75) Inventors: Yoshio Fukuzawa, Machida; Kazuo Obata, Shintone; Takayuki Hayashi, Ryugasaki, all of (JP)

(73) Assignee: Yukigaya Chemical Industry Co., Ltd., Tokyo (JP)

( * ) Notice: Subject to any disclaimer, the term of this patent is extended or adjusted under 35 U.S.C. 154(b) by 0 days.

(21) Appl. No.: 09/899,785

(22) Filed: Jul. 5, 2001

(65) Prior Publication Data

US 2002/0019450 A1 Feb. 14, 2002

(30) Foreign Application Priority Data

Jul. 10, 2000 (JP) ........................................ 2000-246047

(51) Int. Cl.$^7$ .............................. C08G 18/32; C08J 9/00
(52) U.S. Cl. .......................... 521/130; 521/97; 521/98; 521/130; 521/132; 521/172; 521/173; 521/150
(58) Field of Search ............................ 521/98, 97, 172, 521/155, 173, 130, 132, 150

(56) References Cited

U.S. PATENT DOCUMENTS

| 471,343 A | 3/1892 | Poehl |
| 2,204,202 A | 6/1940 | Zimmerman |
| 3,337,895 A | 8/1967 | Clements |
| 3,991,011 A | * 11/1976 | Marciniak et al. ............. 521/98 |
| 4,588,752 A | * 5/1986 | Kmiec et al. ................. 521/82 |
| 4,706,693 A | 11/1987 | Spector |
| 4,776,356 A | 10/1988 | Jou et al. |
| 4,797,426 A | * 1/1989 | Waki et al. ................... 521/98 |
| 5,753,718 A | * 5/1998 | Jacks ......................... 521/142 |
| 5,762,946 A | 6/1998 | Gueret |
| 6,040,351 A | * 3/2000 | Okita et al. .................. 521/98 |
| 6,121,337 A | * 9/2000 | Hammel et al. ............. 521/131 |

FOREIGN PATENT DOCUMENTS

GB 474732 11/1937

* cited by examiner

*Primary Examiner*—Morton Foelak
(74) *Attorney, Agent, or Firm*—Hoffman & Baron, LLP

(57) ABSTRACT

A sponge including an elastic material having a lipid, such as an oil, a fat, or a combination thereof, integrally formed therewith. The elastic material includes an amount from between 0.5 to 20 parts by weight of the lipid, and the lipid is selected from the group consisting of esters of fatty acids, alkanes, squalane and derivatives thereof squalene, bisabolol, animal hair oils and fats, wax, lanolin and combinations thereof to provide the sponge with a gentle feel. The sponge may also be made by first foam molding the sponge from an elastic material, impregnating the sponge with a water-dispersed lipid and allowing the sponge to dry for a predetermined amount of time so that the lipid is substantially inseparable from the elastic material.

17 Claims, No Drawings

ELASTIC SPONGE

FIELD OF THE INVENTION

The present invention generally relates to a sponge having improved rubber elasticity and its manufacturing method and more particularly to a sponge with an improved gentle feel and its manufacturing method.

BACKGROUND OF THE INVENTION

Conventionally, a sponge having rubber elasticity is typically made from a material obtained by foam molding using polyurethane or other polymer elastomers, rubber or other materials. Such sponges have been used as washing implements, cosmetic implements, coating tools, wiping tools, cushion material, transporting parts, packing parts and in a variety of other fields. In the case of washing implements, cosmetic implements, coating tools, wiping tools, and cushion material, a sponge with a soft, gentle feel has been required. This requirement can be met in several ways during manufacture of the sponge. For example, a soft gentle texture can be achieved by decreasing the surface roughness with fine gas bubbles with a gas bubble diameter of 200 $\mu$m or less. The sponge can be made puffy with an apparent specific gravity of 0.10 g/cm$^3$ or less. Finally, the apparent rubber hardness can be suppressed to a low level or a soft resin can be used.

However, although decreasing the gas bubble diameter results in reducing the roughness and a smooth feel is achieved, a dry texture is produced at the same time. Furthermore, while decreasing the apparent specific gravity results in a puffy sponge, a gentle feel is not produced. On the contrary, a sticky texture is produced in an undesirable manner. Moreover, in decreasing the apparent specific gravity, there are other problems in that the mechanical strength is decreased, foam molding is difficult, shrinkage deformation occurs during molding, and internal cracks are formed. Furthermore, making the gas bubbles small and decreasing the apparent specific gravity are contradictory with each other. In particular, it is very difficult to achieve these goals at the same time. Alternatively, if a soft resin is used, although the sponge is made soft, a tacky feel due to poor rubber elasticity is produced. In addition, such soft resins are inherently characterized with a low mechanical strength. Thus, a gentle feel cannot be achieved by any of these methods.

Accordingly, it would be desirable to provide a sponge having an improved gentle texture that is not made by conventional prior art techniques.

SUMMARY OF THE INVENTION

The present invention is a sponge with an improved gentle feel. As a result of zealous research investigations, the present inventors have discovered that a gentle feel can be obtained by containing a lipid, such as an oil, a fat, or a combination thereof in the sponge. In other words, the sponge of the present invention is a material characterized by the fact that an oil, a fat, or a combination thereof is contained in a sponge having rubber elasticity.

In a preferred embodiment, the sponge of the present invention generally includes an elastic material having a lipid, such as an oil, a fat, or a combination thereof, integrally formed therewith. Preferably, the elastic material includes an amount from between 0.5 to 20 parts by weight of the lipid, and the lipid is selected from the group consisting of esters of fatty acids, alkanes, squalane and derivatives thereof, squalene, bisabolol, animal hair oils and fats, wax, lanolin and combinations thereof. The elastic material further preferably includes a nonionic surfactant integrally formed therewith in an amount from between 0.5 to 20 parts by weight of the nonionic surfactant.

In an alternate embodiment, the sponge of the present invention generally includes an elastic material having a lipid, such as an oil a fat, or a combination thereof, that is substantially inseparable from the elastic material. Preferably, the elastic material includes an amount from between 0.5 to 20 parts by weight of the lipid, and the lipid is selected from the group consisting of esters of fatty acids, alkanes, squalane and derivatives thereof, squalene, bisabolol, animal hair oils and fats, wax, lanolin and combinations thereof. The elastic material further preferably includes a nonionic surfactant integrally formed therewith in an amount from between 0.5 to 20 parts by weight of the nonionic surfactant.

In a preferred method for forming the sponge of the present invention, an elastic material is mixed with a lipid, such as an oil, a fat or a combination thereof, and the elastic material and lipid mixture is foam molded to form the sponge. Preferably, an amount from between 0.5 to 20 parts by weight of lipid is mixed with the elastic material and the lipid is selected from the group consisting of esters of fatty acids, alkanes, squalane and derivatives thereof, squalene, bisabolol, animal hair oils and fats, wax, lanolin and combinations thereof. The elastic material and lipid is further preferably mixed with a nonionic surfactant in an amount from between 0.5 to 20 parts by weight of the nonionic surfactant.

In an alternate method for forming the sponge of the present invention, a sponge is first foam molded from an elastic material. The sponge is then impregnated with a water-dispersed lipid and allowed to dry for a predetermined amount of time so that the lipid is substantially inseparable from the elastic material. The lipid is preferably selected from the group consisting of esters of fatty acids, alkanes, squalane and derivatives thereof, squalene, bisabolol, animal hair oils and fats, wax, lanolin and combinations thereof.

A preferred embodiment of an elastic sponge and its method of manufacture as well as other embodiments, features and advantages of this invention will be apparent from the following detailed description, which is to be read in conjunction with the accompanying examples.

DETAILED DESCRIPTION OF THE PREFERRED EMBODIMENTS

The improved texture of the sponge of the present invention is produced by containing a lipid, i.e., an oil, a fat, or a combination thereof, in the sponge. Preferably, the lipids used in the present invention include naturally and artificially obtained fatty acid esters, lanolin, oils and fats extracted from animal hair, squalane and its derivatives, squalene (oils and fats extracted from deep sea sharks and related artificial products), bisabolol, wax, etc. and mixtures thereof. The amount of their usage is 0.5–20 parts by weight, preferably 1.0–10 parts by weight, with respect to 100 parts by weight of the raw material resin. If more is used, a gentle feel cannot be achieved, but instead a tacky feel will be produced in an undesirable manner. Furthermore, if more than 20 parts by weight oil or fat is used, collapsing of bubbles will occur during foam molding and a uniform sponge cannot be obtained.

It is further preferable to use oils and fats in combination with a polyoxyethylene alkyl ether or another nonionic surfactant. By combining a nonionic surfactant with the lipid, collapsing of bubbles will not easily occur during foam molding. It is preferable that the nonionic surfactant be used at 0.5–20 parts by weight with respect to 100 parts by weight of the raw material resin.

The base material for the sponge is preferably one having superior rubber elasticity obtained by open cell or closed cell foam molding of polyurethane, rubber or other polymer elastomers, including polyethylene type elastomers, vinyl type elastomers, etc. Of the above mentioned elastomers, polyurethane is preferred. The elastomer can be provided in pure resin form or can be in emulsion. Furthermore, a polyol and an isocyanate as resin raw materials can also be used like polyurethane. Suitable rubbers for the sponge of the present invention include NR, DPNR, NBR, IR, BR, SBR, CR, EPDM, silicone rubber, acrylic rubber, or mixtures thereof. Furthermore, the rubber used can be a latex or can be in resin form.

The sponge of the present invention is manufactured by foam molding of a mixture of a raw material resin and at least one lipid. A variety of other additives can also be introduced into the mixture as described below. Any conventional method for foam molding can be used. For example, in the method of foaming by the generation of a gas, the gas is generated by a method in which a blowing agent is mixed in a raw material resin followed by heating, and then foam molding is carried out. Alternatively, foam molding can be carried out by blending a water-soluble salt in a raw material resin, molding, and forming pores by dissolution and extraction of the salt in water. Another alternative method is by dissolving a raw material resin in a water-soluble solvent, and forming pores by extraction of the solvent by introducing this resin solution into water. Furthermore, it is possible for a raw material resin to be converted into an emulsion or latex, and for air or the like to be stirred or mixed in to cause foaming, and molding to be carried out.

Where polyurethane resin is used as the base material, it is preferred that the lipid, an additive and a blowing agent be mixed with a polyol as a resin raw material, and for this to be reacted with an isocyanate to cause the generation of a gas at the same time as the formation of the resin, followed by foam molding.

In mixing the lipid with the elastomer resin, it is preferred to use a method in which the lipid is dissolved or dispersed in the resin. Furthermore, it is also possible for a water-dispersed lipid to be prepared first, and to be mixed into a raw material emulsion or latex.

It is also possible for the sponge of the present invention to be manufactured by a method in which the oils and fats mentioned previously are adhered onto a sponge prepared beforehand. For example, the lipid can be converted into a water-dispersed material that is introduced into the sponge and allowed to dry.

The lipids introduced into the sponge bleed on the surface of the resin that forms the frame or skeleton of the sponge and a thin film is thereby formed. This results in a sponge having an improved gentle feel and a frictional coefficient of the sponge on the magnitude of 0.2 to 0.5.

It is desirable that the average cell size, i.e., gas bubble diameter, for the sponge of the present invention be 200 $\mu$m or less, and more preferably 150 $\mu$m or less. By decreasing the average gas bubble diameter, the gentle feel is emphasized. This is presumably due to the fact that the resin portion forming the gas bubble frame becomes more detailed, i.e., more cells appear per unit area, and there is an amplified effect because of coating of each of these cells by the lipid. In this case, it is possible that the amount of the lipid used can be decreased to 0.5 part by weight with respect to 100 parts by weight of the raw material resin. The gas bubble diameter can be reduced, for example, by atomizing the blowing agent, by increasing the rotational speed of the mixer during foaming and/or by increasing the apparent specific gravity of the resin among other ways.

APPLICATION EXAMPLE 1

As raw materials for a polyurethane sponge, the following two liquids were prepared:

1. Polyol mixture
   a) 100 parts by weight of 60% of a bifunctional polyether polyol (G-2000, manufactured by Asahi Denka Co) with an average molecular weight of 2000 and 40% of a trifunctional polyether polyol (P-3000B, manufactured by Asahi Denka Co.) with an average molecular weight of 3000 were measured.
   b) 1.0 part by weight water as a blowing agent.
   c) 0.1 part by weight triethylenediamine.
   d) 0.5 part by weight N-ethylmorpholine
   e) 0.2 part by weight 1,2-dimethylimidazole as catalysts.
   f) 1.0 part by weight silicone surfactant foam-adjusting agent conditioner (SZ-1127 manufactured by Nippon Unicar Co.)
   g) 1.0 part by weight silicone surfactant foam-adjusting agent conditioner (L-580 manufactured by Nippon Unicar Co.)
   h) 0.5 part by weight benzotriazole ultraviolet ray absorber agent (Tinuvine 328 manufactured by Ciba Geigy Co.)
   i) 0.5 part by weight phenol antioxidant (AO-70 manufactured by Asahi Denka Co.)
   j) 5.0 parts by weight squalane (SQUALANE-N, manufactured by Kurare Co.)
   k) 2.5 parts by weight polyoxyethylenelauric ethers (EMULGEN 106, manufactured by Kao Co.)
2. Isocyanate mixture
   a) 30 parts by weight of a 1/1 mixture of 4,4'-diphenylmethane diisocyanate and 2,4'-diphenylmethane diisocyanate were prepared.

This polyol component and the isocyanate were heated to a temperature of 40° C., and stirred and mixed at the ratios mentioned previously for 10 sec in a juicer mixer at a high speed. Immediately after mixing, foaming began. The mixed solution was injected into a 11-cm diameter circular columnar mold immediately after mixing. After 30 sec, the mold was enclosed. After standing at 60° C. for 1 hour, the sponge was removed from the mold. It was sliced into thicknesses of 2 mm.

The sponge had an open cell and continuous gas bubble structure. It had rubber elasticity. The feel was gentle, similar to a baby's skin. The apparent specific gravity was 0.124 g/cm$^3$, the average gas bubble diameter was 130 $\mu$m, and the frictional coefficient with respect to smooth aluminum was 0.33.

The sponge was molded into a bag shape, installed on axial wood, and used as a cosmetic eye shadow applicator. There was a gentle feel of use, similar to a fingertip. Furthermore, the cosmetic effectiveness was good. The cosmetic material coated without unevenness.

APPLICATION EXAMPLES 2 AND 3

Sponges were prepared in the same manner as in Application Example 1 except that the amounts of squalane used were 1.0 part by weight in Application Example 2 and 10 parts by weight in Application Example 3.

Comparative Example 1

The sponge was prepared in the same manner as in Application Example 1 except that no oils or fats were used (i.e., squalane and polyoxyethylenelauric ether was excluded). The sponge was fine-grained in the same manner as in Application Example 1. There was a smooth feel. However, there was a dry feel at the same time.

The results of Application Examples 1–3 and Comparative Example 1 are shown in the following table:

TABLE

|  | Application Example 1 | Application Example 2 | Application Example 3 | Comparative Example 1 |
|---|---|---|---|---|
| Squalane (parts) | 5.0 | 1.0 | 10 | 0 |
| Specific Gravity (g/cm$^3$) | 0.124 | 0.124 | 0.125 | 0.123 |
| Average Cell Size ($\mu$m) | 130 | 128 | 135 | 132 |
| Frictional Coefficient | 0.33 | 0.20 | 0.50 | 0.13 |
| Feel to the Touch |  |  |  |  |
| First Impression | Gentle | Gentle | Gentle | Smooth |
| Second Impression |  | Smooth | Sticky | Dry |

APPLICATION EXAMPLE 4

A sponge was prepared in the same manner as in Application Example 1 except that 5.0 parts by weight lanolin was used as the lipid. The sponge prepared had a gentle feel.

APPLICATION EXAMPLE 5

A 100 parts by weight of NBR latex (LX-531, manufactured by Nippon Zeon Co.) was produced with the following additives:
a) 1.5 dry parts by weight sulfur
b) 1.5 parts by weight vulcanization accelerator EZ (Zinc diethylthiocarbamate)
c) 3.0 parts by weight zinc oxide
d) 1.0 part by weight antioxidant BHT (2,4-di-tert-butyl-p-hydroxytoluene)
e) 0.1 part by weight sodium oleate
f) 3.0 parts by weight solidifying agent NaSiF
g) 5.0 parts by weight squalane
h) 2.5 parts by weight polyoxyethylenelauric ether (EMULGEN 106, manufactured by Kao Co.)

These materials and air were stirred and mixed in an Oaks mixer to cause foaming. The foamed product was poured into a 60-mm diameter circular columnar mold made of aluminum. After the foamed product had solidified, vulcanization was carried out in a vapor kettle at 100° C. for 1 hour. The foamed product was an elastic sponge of fine open cell structure. It was removed from the mold, washed with water, and dried. It was then cut into thicknesses of 8 mm. The periphery was polished with a grinder to give a curved surface and a circular plate shape.

The sponge had an apparent specific gravity of 0.132 g/cm$^3$, an average cell size (gas bubble diameter) of 180 $\mu$m and a frictional coefficient comparable with smooth aluminum at 0.33. Despite being formed of rubber, the sponge had a gentle feel. This was used as a puff for a cosmetic foundation. There was a gentle feel of use, similar to using a fingertip. Furthermore, the cosmetic effectiveness was excellent in that the cosmetic material coated without unevenness.

Comparative Example 2

A sponge was prepared in the same manner as in Application Example 5 except that no squalane or polyoxyethylenelauric ether was used. The sponge obtained had an apparent specific gravity of 0.132 g/cm$^3$, an average cell size (gas bubble diameter) of 175 $\mu$m and a frictional coefficient of 0.84.

However, there was no gentle feel. Instead, there was a tacky feel similar to the stickiness of a conventional rubber sponge.

APPLICATION EXAMPLE 6

The sponge prepared in Comparative Example 2 was soaked with a water-dispersed emulsion of squalane (with a squalane concentration of 5.0% density) and polyoxyethylenelauric ether (EMULGEN 106 from Kao Corp., 5.0% density). It was squeezed by hand so that the squeezing ratio was 100%. Afterwards, it was dried at room temperature for two days. It was then further dried in an electric drying box at 60° C. for 2 hours. The sponge had a frictional coefficient of 0.38 and a remarkable gentle feel in comparison to the sponge of Comparative Example 2.

As a result of the present invention, a sponge having a gentle feel can be obtained. It provides an excellent feel in use as a cushion material, a washing tool, and a cosmetic tool for applications requiring contact with human skin. Furthermore, the gentle feel can be appropriately adjusted from dry to tacky, like cohesion, for example.

Although the illustrative embodiments of the present invention have been described herein with reference to the accompanying drawings, it is to be understood that the invention is not limited to those precise embodiments and that various other changes and modifications may be effected therein by one skilled in the art without departing from the scope or spirit of the invention.

What is claimed is:

1. A sponge comprising an elastic material, said elastic material including a lipid integrally formed therewith, said lipid being selected from the group consisting of squalane and derivatives thereof, squalene, bisabolol, lanolin and combinations thereof, whereby said sponge has a frictional coefficient of 0.2 to 0.5.

2. A sponge comprising an elastic material, said elastic material including a lipid that is substantially inseparable from the elastic material, said lipid being selected from the group consisting of squalane and derivatives thereof, squalene, bisabolol, lanolin and combinations thereof, whereby said sponge has a frictional coefficient of 0.2 to 0.5.

3. The sponge as defined in claim 2, wherein the elastic material includes an amount from between 0.5 to 20 parts by weight of the lipid.

4. The sponge as defined in claim 2, wherein the elastic material further includes a nonionic surfactant integrally formed therewith.

5. The sponge as defined in claim 4, wherein the elastic material includes an amount from between 0.5 to 20 parts by weight of the nonionic surfactant.

6. A method for forming a sponge comprising the steps of:
   mixing an elastic material with a lipid selected from the group consisting of squalane and derivatives thereof, squalene, bisabolol, lanolin and combinations thereof; and foam molding the elastic material and lipid mixture to form a sponge, whereby said sponge has a frictional coefficient of 0.2 to 0.5.

7. The method as defined in claim 6, wherein an amount from between 0.5 to 20 parts by weight of lipid is mixed with the elastic material.

8. The method as defined in claim 6, further comprising the step of mixing a nonionic surfactant with the elastic material and the lipid.

9. The method as defined in claim 8, wherein an amount from between 0.5 to 20 parts by weight of the nonionic surfactant is mixed with the elastic material and the lipid.

10. A method for forming a sponge comprising the steps of:

foam molding an elastic material to form a sponge;

impregnating the sponge with a water-dispersed lipid, said lipid being selected from the group consisting of squalane and derivatives thereof, squalene, bisabolol, lanolin and combinations thereof; and drying the sponge for a predetermined amount of time so that the lipid is substantially inseparable from the elastic material, whereby said sponge has a frictional coefficient of 0.2 to 0.5.

11. The sponge as defined in claim 1, wherein the elastic material is polyurethane.

12. The sponge as defined in claim 1, wherein the elastic material is rubber.

13. The sponge as defined in claim 1, wherein the elastic material includes an amount from between 0.5 to 20 parts by weight of the lipid.

14. The sponge as defined in claim 1, wherein the elastic material further includes a nonionic surfactant integrally formed therewith.

15. The sponge as defined in claim 14, wherein the elastic material includes an amount from between 0.5 to 20 parts by weight of the nonionic surfactant.

16. The sponge as defined in claim 14, wherein the nonionic surfactant is polyoxyethylene alkyl ether.

17. The method as defined in claim 10, further comprising the step of mixing a nonionic surfactant with the elastic material and the lipid.

* * * * *